United States Patent
Kuo

(10) Patent No.: US 9,014,150 B2
(45) Date of Patent: Apr. 21, 2015

(54) METHOD AND APPARATUS OF ENHANCING PERFORMANCE OF DOWNLINK MULTI-USER MULTIPLE-INPUT-MULTIPLE-OUTPUT TRANSMISSIONS IN WIRELESS COMMUNICATION SYSTEM

(71) Applicant: Industrial Technology Research Institute, Hsinchu (TW)

(72) Inventor: Ping-Heng Kuo, Hsinchu County (TW)

(73) Assignee: Industrial Technology Research Institute, Chutung, Hsinchu (TW)

(*) Notice: Subject to any disclaimer, the term of this patent is extended or adjusted under 35 U.S.C. 154(b) by 112 days.

(21) Appl. No.: 13/747,482

(22) Filed: Jan. 23, 2013

(65) Prior Publication Data

US 2013/0235815 A1    Sep. 12, 2013

Related U.S. Application Data

(60) Provisional application No. 61/607,016, filed on Mar. 6, 2012.

(51) Int. Cl.
*H04W 4/00* (2009.01)
*H04W 24/02* (2009.01)
*H04L 5/00* (2006.01)

(52) U.S. Cl.
CPC .............. *H04W 24/02* (2013.01); *H04L 5/0023* (2013.01)

(58) Field of Classification Search
None
See application file for complete search history.

(56) References Cited

U.S. PATENT DOCUMENTS

| | | | | |
|---|---|---|---|---|
| 2011/0142147 | A1* | 6/2011 | Chen et al. | 375/260 |
| 2011/0170427 | A1* | 7/2011 | Koivisto et al. | 370/252 |
| 2011/0176629 | A1* | 7/2011 | Bayesteh et al. | 375/267 |
| 2011/0200131 | A1* | 8/2011 | Gao et al. | 375/267 |
| 2011/0243019 | A1* | 10/2011 | Prasad et al. | 370/252 |
| 2012/0057482 | A1* | 3/2012 | Geirhofer et al. | 370/252 |
| 2012/0106470 | A1* | 5/2012 | Clerckx et al. | 370/329 |
| 2012/0314590 | A1* | 12/2012 | Choudhury et al. | 370/252 |
| 2013/0022021 | A1* | 1/2013 | Wild et al. | 370/330 |
| 2014/0169287 | A1* | 6/2014 | Chen et al. | 370/329 |
| 2014/0233414 | A1* | 8/2014 | Prasad et al. | 370/252 |

FOREIGN PATENT DOCUMENTS

EP    2 375 581 A1    10/2011

* cited by examiner

*Primary Examiner* — Anh-Vu Ly
(74) *Attorney, Agent, or Firm* — Winston Hsu; Scott Margo

(57) ABSTRACT

A method of enhancing performance of downlink multi-user multiple-input-multiple-output transmissions in a wireless communication system comprising a communication device and a network is disclosed. The method comprises generating a feedback report comprising a correlation-based validity threshold (CVT); and transmitting the feedback report from the communication device to the network.

24 Claims, 4 Drawing Sheets

METHOD AND APPARATUS OF ENHANCING PERFORMANCE OF DOWNLINK MULTI-USER MULTIPLE-INPUT-MULTIPLE-OUTPUT TRANSMISSIONS IN WIRELESS COMMUNICATION SYSTEM

CROSS REFERENCE TO RELATED APPLICATIONS

This application claims the benefit of U.S. Provisional Application No. 61/607,016, filed on Mar. 6, 2012, entitled "Feedback Methods for MU-MIMO", the contents of which are incorporated herein in their entirety.

BACKGROUND OF THE INVENTION

1. Field of the Invention

The present invention relates to a method and apparatus utilized in a wireless communication system, and more particularly, to a method and apparatus of enhancing performance of downlink multi-user multiple-input-multiple-output transmissions in a wireless communication system.

2. Description of the Prior Art

A long-term evolution (LTE) system supporting the 3GPP Rel-8 standard and/or the 3GPP Rel-9 standard are developed by the 3rd Generation Partnership Project (3GPP) as a successor of a universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple UEs, and communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint transmission/reception (CoMP), uplink (UL) multiple-input multiple-output (MIMO), downlink MU-MIMO, etc. For a UE and an eNB to communicate with each other in the LTE-A system, the UE and the eNB must support standards developed for the LTE-A system, such as the 3GPP Rel-10 standard or later versions.

The downlink MU-MIMO technique, which is an advanced multi-antenna technique, can be used in an eNB to simultaneously transmit independent data to a plurality of UEs in the same frequency resources. A precoder is constructed to implement the downlink MU-MIMO technique. In other words, the construction of the precoder is based on feedback information from the UEs and regarded as an essential key to implement the downlink MU-MIMO technique. Therefore, each of the UEs should respectively send its favorite precoder index as well as the channel quality indication (CQI), to assist the eNB to construct a precoder matrix for downlink MU-MIMO transmissions.

Since a potential interference may exist in a paired UE assigned in a downlink MU-MIMO transmission, a resultant performance may be degraded due to over-estimated CQI and inappropriate modulation and coding schemes (MCS) assignment, and/or unsuitable mode selection from single-user MIMO (SU-MIMO) mode and MU-MIMO mode. Therefore, the standardization of 3GPP LTE has provided several directions for MU-MIMO enhancements, such as additional feedback with a precoder matrix index (PMI), a best companion PMI (BCI) and a multi-user CQI (MU-CQI). Generally speaking, PMI represents the precoder to be applied at the eNB that maximizes the signal power with respect to the UE, and BCI represents the precoder for the paired UE at the eNB that causes least interference to the UE. In addition, MU-CQI is the CQI derived by taking interference from the paired UE into account.

Besides, a paper, "Y. Du, J. Tong, J Zhang and S. Liu, 'Evaluation of PMI Feedback Schemes for MU-MIMO Pairing', *IEEE Systems Journal*, vol. 4, No. 4, pp. 505-510, December 2010", has provided a feedback method for a UE. In this paper, a codebook of the precoder is divided into several clusters, each cluster is consisted of multiple codebook entries, and an index of the best companion cluster (BCC) is as a feedback instead of the BCI. The index of the BCC corresponds to a precoder cluster that contains a desirable BCI, and the eNB treats all entries in the BCC as the feasible companion precoders that can be paired with the UE. Besides, the MU-CQI is reported based on the average among all candidate companion precoders in the BCC.

Since the number of the BCCs is smaller than the codebook size, the approach provides scheduling flexibility while reducing feedback overhead. However, the method in the paper cannot capture the true degradation in the MU-CQI and the codebook clustering is specified offline, so that the performance of the method would be dramatically deteriorated when some of the more advanced precoding techniques are introduced in the future wireless communication systems. Therefore, it is necessary to provide other feedback methods to optimize the construction of the precoder.

SUMMARY OF THE INVENTION

The present invention therefore provides a method for sending feedback reports in a wireless communication system, to improve the performance of downlink multiple-input multiple-output transmissions.

A method of enhancing performance of downlink multi-user multiple-input-multiple-output transmissions in a wireless communication system comprising a communication device and a network is disclosed. The method comprises generating a feedback report comprising a correlation-based validity threshold (CVT); and transmitting the feedback report from the communication device to the network.

A method of enhancing performance of downlink multi-user multiple-input-multiple-output transmissions in a wireless communication system comprising a communication device and a network is disclosed. The method comprises generating a feedback report comprising a compromised MU-CQI; and transmitting the feedback report from the communication device to the network.

A communication apparatus for a wireless communication system is disclosed. The communication apparatus comprises a processing means; a storage unit; and a program code, stored in the storage unit, wherein the program code instructs the processing means to execute the following steps: generating a feedback report comprising a precoding matrix index (PMI), a best companion PMI (BCI), a multi-user channel quality indication (MU-CQI) and a correlation-based validity threshold (CVT); and transmitting the feedback report from a communication device to a network.

A communication apparatus for a wireless communication system is disclosed. The communication apparatus comprises a processing means; a storage unit; and a program code, stored in the storage unit, wherein the program code instructs the processing means to execute the following steps: generating a feedback report comprising a compromised MU-CQI; and transmitting the feedback report from a communication device to a network.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
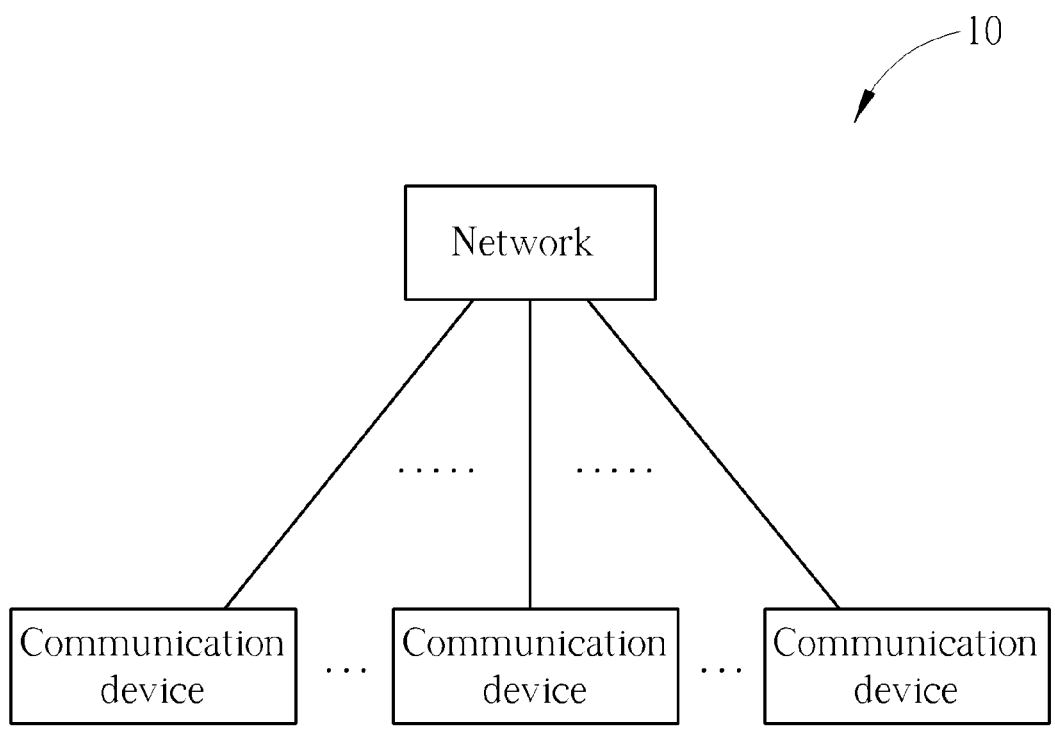
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. Practically, the network can be a universal terrestrial radio access network (UTRAN) comprising a plurality of Node-Bs (NBs) in a universal mobile telecommunications system (UMTS). Alternatively, the network can be an evolved UTRAN (E-UTRAN) comprising a plurality of evolved NBs (eNBs) and/or relays in a long term evolution (LTE) system or a LTE-Advanced (LTE-A) system.

Furthermore, the network can also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. Besides, the information can be processed by both the UTRAN/E-UTRAN and the core network, and the decisions are made after coordination and/or cooperation are performed by the UTRAN/E-UTRAN and the core network.

The communication devices can be mobile communication devices such as user equipments for performing speech and data communication through the network such as the UMTS, the LTE system or the LTE-A system. Besides, the network and a communication device can be seen as a transmitter or a receiver according to transmission direction, e.g., for an uplink (UL), the communication device is the transmitter and the network is the receiver, and for a downlink (DL), the network is the transmitter and the communication device is the receiver.

Figure 2:
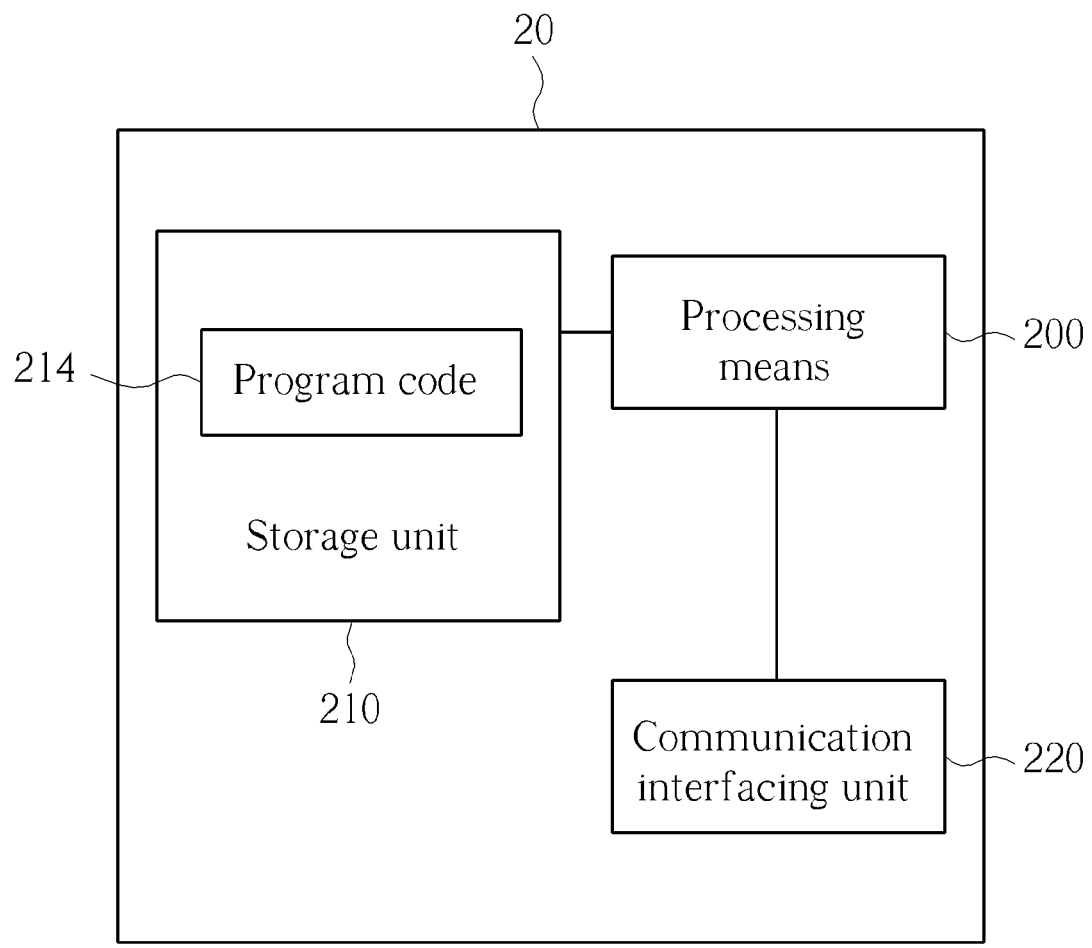
FIG. 2 is a schematic diagram of a communication apparatus according to an example of the present invention.

Please refer to FIG. 2, which is a schematic diagram of a communication apparatus 20 according to an example of the present invention. The communication apparatus 20 can be one of the communication devices shown in FIG. 1, such as a user equipment, but is not limited herein. The communication apparatus 20 may include a processing means 200 such as a microprocessor or Application Specific Integrated Circuit (ASIC), a storage unit 210 and a communication interfacing unit 220. The storage unit 210 may be any data storage device that can store a program code 214, accessed and executed by the processing means 200. Examples of the storage unit 210 include but are not limited to read-only memory (ROM), flash memory, random-access memory (RAM), CD-ROM/DVD-ROM, magnetic tape, hard disk and optical data storage device. The communication interfacing unit 220 is preferably a transceiver and is used to transmit and receive signals (e.g., messages or packets) according to processing results of the processing means 200.

Figure 3:
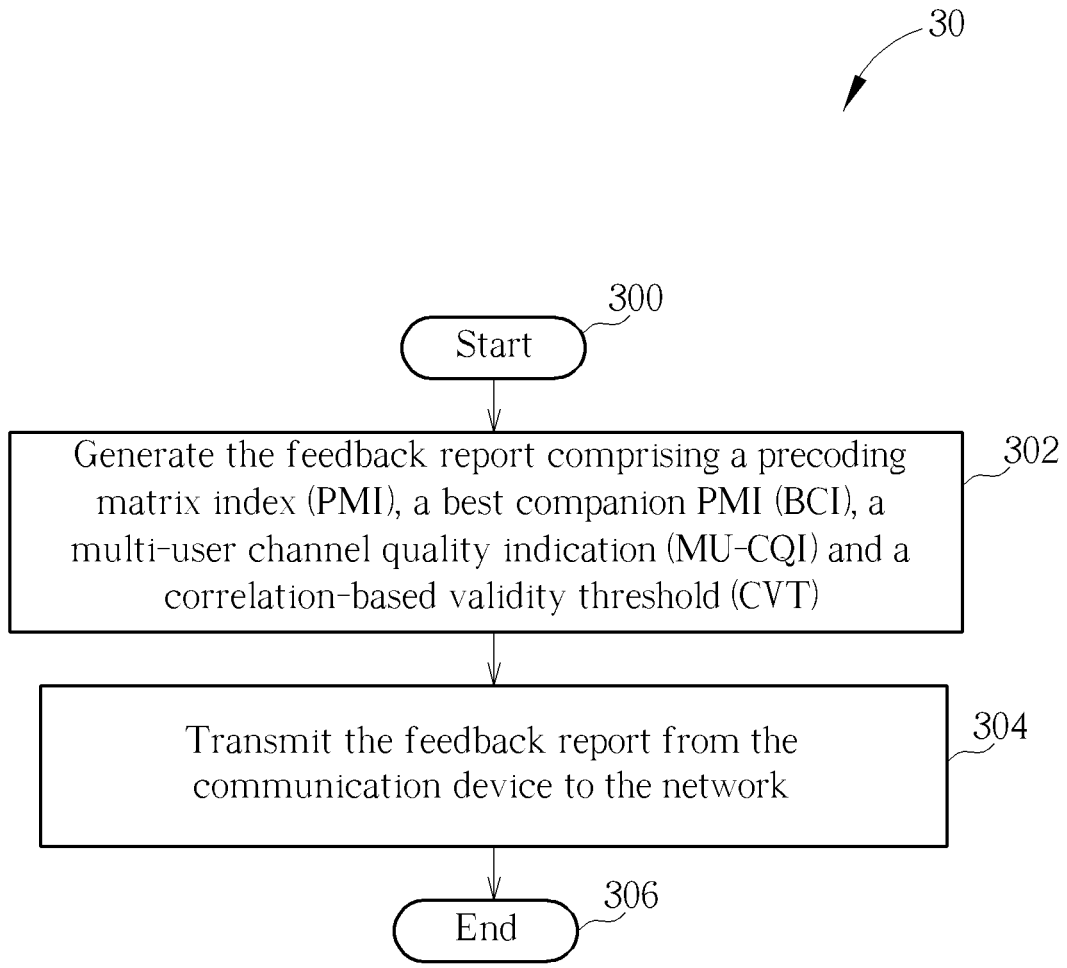
FIG. 3 is a flowchart of a process according to an example of the present invention.

Please refer to FIG. 3, which is a flowchart of a process 30 according to an example of the present invention. The process 30 is utilized in the wireless communication system 10 shown in FIG. 1, for sending a feedback report in one of the communication devices to enhance performance of downlink multi-user multiple-input-multiple-output (MIMO) transmissions from the network to the communication devices. The process 30 can be implemented in the communication apparatus 20 and may be compiled into the program code 214. The process 30 includes the following steps:

Step 300: Start.

Step 302: Generate the feedback report comprising a pre-coding matrix index (PMI), a best companion PMI (BCI), a multi-user channel quality indication (MU-CQI) and a correlation-based validity threshold (CVT).

Step 304: Transmit the feedback report from the communication device to the network.

Step 306: End.

According to the process 30, the communication device generates the feedback report comprising the PMI, the BCI, the MU-CQI and the CVT and further transmits the feedback report to the network. Therefore, the network is able to perform appropriate modulation and coding scheme (MCS) selection and suitable mode selection from single-user MIMO (SU-MIMO) mode and multi-user MIMO (MU-MIMO) mode for the communication device, to enhance the performance of the downlink MIMO transmissions.

In the process 30, the MU-CQI may be derived from a CQI function of the PMI and the BCI, and the CVT may be derived from a CQI function of the PMI, the BCI and any other precoder in a codebook other than the BCI. For example, the MU-CQI can be determined by the following equations:

$$\xi = q(W_{PMI}, W_{BCI}) = Q_{CQI}\{|hW_{PMI}|^2/(|hW_{BCI}|^2 + \sigma^2)\}$$

wherein $\xi$ denotes the MU-CQI, h denotes the spatial channel vector between a transmitter and a receiver, $W_{PMI}$ denotes the PMI, $W_{BCI}$ denotes the BCI, $\sigma^2$ denotes additive noise power, and $Q_{CQI}$ denotes a specified function of quantization. In this regard, the CVT can be derived according to each of the following four algorithms:

(A-1) The first algorithm can be represented by the following equations:

$$\xi_1 = q(W_{PMI}, W_{BCI});$$

$$\xi_2 = q(W_{PMI}, W_{N\_BCI});$$

$$c = \arg\min |W_{BCI}^* W_{N\_BCI}|, \text{ subject to } (\xi_1 - \xi_2) \leq \Delta\xi,$$
$$\text{where } \Delta\xi \geq 0$$

wherein c denotes the CVT, $W_{PMI}$ denotes the PMI, $W_{BCI}$ denotes the BCI, $W_{N\_BCI}$ denotes the any other precoder in the codebook other than the BCI, $\Delta\xi$ denotes a pre-defined deviation value, * denotes the complex-conjugate operation, and the function q denotes a CQI function. Besides, the CQI function is determined as the following equations:

$$\xi'=q(W_{PMI},W_{INTI})=Q_{CQI}\{|hW_{PMI}|^2/(|hW_{INTI}|^2+\sigma^2)\}$$

wherein $\xi'$ denotes the MU-CQI, h denotes the spatial channel vector between a transmitter and a receiver, $W_{PMI}$ and $W_{INTI}$ denote the precoders that filter the signal and interference (i.e. $W_{PMI}$ is the PMI and $W_{INTI}$ is the BCI or the any other precoder in the codebook other than the PMI herein), $\sigma^2$ denotes additive noise power, and $Q_{CQI}$ denotes a specified function of quantization.

In detail, the CVT c can be defined as the lowest cross-correlation between an entry of the codebook $W_{N\_BCI}$ and the BCI $W_{BCI}$ that retains the validity of MU-CQI or maintains the deviation of MU-CQI within the pre-defined deviation value $\Delta\xi$. Therefore, the network can determine if the reported MU-CQI $\xi$ is still valid according to the reported CVT c when the communication device is not paired with its favorite partner, and further decide to change the MCS or to switch between the SU-MIMO mode and the MU-MIMO mode in a precise manner.

(A-2) The second algorithm can be represented by the following equations:

$$\xi_1=q(W_{PMI},W_{BCI});$$

$$\xi_2=q(W_{N\_PMI},W_{BCI});$$

$$c=\arg\min|W_{PMI}{}^*W_{N\_PMI}|, \text{ subject to } (\xi_1-\xi_2)\leq\Delta\xi,$$
where $\Delta\xi\geq 0$ wherein c denotes the CVT, $W_{PMI}$ denotes the PMI, $W_{BCI}$ denotes the BCI, $W_{N\_PMI}$ denotes the any other precoder in the codebook other than the PMI, $\Delta\xi$ denotes the pre-defined deviation value, * denotes the complex-conjugate operation, and the function q denotes the CQI function as shown above.

In detail, the CVT c can be defined as the lowest cross-correlation between an entry of the codebook $W_{N\_PMI}$ and the PMI $W_{PMI}$ that retains the validity or maintains the deviation within the pre-defined deviation value $\Delta\xi$. Therefore, the network can determine if the reported MU-CQI $\xi$ is still valid according to the reported CVT c when the communication device is paired without applying the reported PMI, and further decide to change the MCS or to switch between the SU-MIMO mode and the MU-MIMO mode in a precise manner.

(A-3) The third algorithm can be represented by the following equations:

$$\xi_1=q(W_{PMI},W_{BCI});$$

$$c=\arg\min|W_{BCI}{}^*W_{N\_BCI}|, \text{ subject to } (\xi_0-\xi_1)\leq\Delta\xi,$$
where $\Delta\xi\geq 0$ wherein c denotes the CVT, $W_{PMI}$ denotes the PMI, $W_{BCI}$ denotes the BCI, $W_{N\_BCI}$ denotes the any other precoder in the codebook other than the BCI, $\xi_0$ denotes the CQI under single-user MIMO assumption (SU-CQI), $\Delta\xi$ denotes the pre-defined deviation value, * denotes the complex-conjugate operation, and the function q denotes the CQI function as shown above.

In detail, the CVT c can be defined as the lowest cross-correlation between an entry of the codebook $W_{N\_BCI}$ and the BCI $W_{BCI}$ that maintains the difference between the SU-CQI $\xi_0$ and the reported MU-CQI $\xi$ within the pre-defined deviation value $\Delta\xi$. Therefore, the network can determine the lower bound of compromising the reported BCI $W_{BCI}$ that retains the motivation of MU-MIMO operation. In other words, the network can switch to the SU-MIMO mode if the lower bound is not fulfilled.

(A-4) The fourth algorithm can be represented by the following equations:

$$\xi_1=q(W_{PMI},W_{BCI});$$

$$c=\arg\min|W_{PMI}{}^*W_{N\_PMI}|, \text{ subject to } (\xi_0-\xi_1)\leq\Delta\xi,$$
where $\Delta\xi\geq 0$ wherein c denotes the CVT, $W_{PMI}$ denotes the PMI, $W_{BCI}$ denotes the BCI, $W_{N\_PMI}$ denotes the any other precoder in the codebook other than the PMI, $\xi_0$ denotes the CQI under single-user MIMO assumption (SU-CQI), $\Delta\xi$ denotes the pre-defined deviation value, * denotes the complex-conjugate operation, and the function q denotes the CQI function as shown above.

In detail, the CVT c can be defined as the lowest cross-correlation between an entry of the codebook $W_{N\_PMI}$ and the PMI $W_{PMI}$ that maintains the difference between the SU-CQI $\xi_0$ and the reported MU-CQI $\xi$ within the pre-defined deviation value $\Delta\xi$. Therefore, the network can determine the lower bound of compromising the reported BCI $W_{BCI}$ that retains the motivation of MU-MIMO operation. Besides, the network can switch to the SU-MIMO mode if the lower bound is not fulfilled.

Note that, the process 30 is an example of the present invention, and those skilled in the art should readily make combinations, modifications and/or alterations on the above-mentioned description and examples. For example, the transmission of the feedback report can be triggered automatically or triggered by the network via broadcast messages or other higher layer signaling. Besides, the feedback report can be carried in messages via high layer signaling, such as measurement reports.

Figure 4:
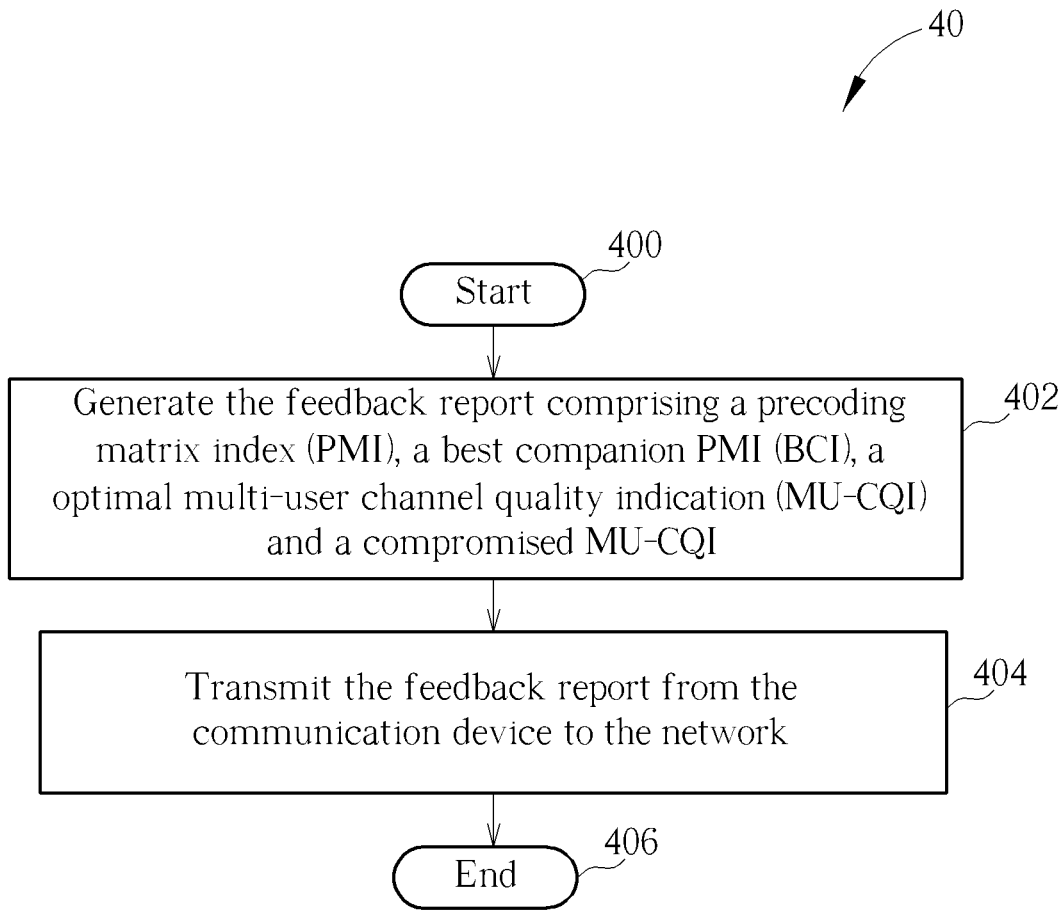
FIG. 4 is a flowchart of a process according to an example of the present invention.

Please refer to FIG. 4, which is a flowchart of a process 40 according to an example of the present invention. The process 40 is utilized in the wireless communication system 10 shown in FIG. 1, for sending a feedback report in one of the communication devices to enhance performance of downlink MIMO transmissions from the network to the communication devices. The process 40 can be implemented in the communication apparatus 20 and may be compiled into the program code 214. The process 40 includes the following steps:

Step 400: Start.

Step 402: Generate the feedback report comprising a precoding matrix index (PMI), a best companion PMI (BCI), a optimal multi-user channel quality indication (MU-CQI) and a compromised MU-CQI.

Step 404: Transmit the feedback report from the communication device to the network.

Step 406: End.

According to the process 40, the communication device generates the feedback report comprising the PMI, the BCI, the optimal MU-CQI and the compromised MU-CQI and further transmits the feedback report to the network. Therefore, the network is able to perform appropriate MCS selection and suitable mode selection from the SU-MIMO mode and the MU-MIMO mode for the communication devices, to enhance the performance of the downlink MIMO transmissions.

The process 30 and the process 40 are similar. The difference between the process 30 and the process 40 is that the feedback report in the process 40 includes the compromised MU-CQI instead of the CVT in the process 30. In detail, the optimal MU-CQI is derived from a CQI function of the PMI and the BCI, and the compromised MU-CQI is derived from a CQI function of the PMI, the BCI and any other precoder in a codebook other than the BCI. In other words, the derivation of the optimal MU-CQI is the same as that of the MU-CQI in the process 30, and the compromised MU-CQI is derived according to each of the following two algorithms:

(B-1) The first algorithm can be represented by the following equations:

$$j^* = \arg\min_{W_j \neq W_{BCI}} |W_{PMI}^* W_j|, \text{ subject to } |W_{BCI}^* W_j| \geq r;$$

$$\xi_{com} = q(W_{PMI}, W_{j^*});$$

wherein $\xi_{com}$ denotes the compromised MU-CQI, $W_{PMI}$ denotes the PMI, $W_{BCI}$ denotes the BCI, j denotes the precoder entry index in the codebook, r denotes a cross-correlation threshold for the PMI, * denotes the complex-conjugate operation, and the function q denotes the CQI function as shown above.

In detail, the communication device identifies a subset of precoders such that one precoder in the subset has a higher cross-correlation level with the reported PMI $W_{PMI}$ than the cross-correlation threshold r. The communication device further calculates the lowest MU-CQI among all precoders in the subset, which is regarded as the compromised MU-CQI $\xi_{com}$. In other words, the communication device provides the upper bound and the lower bound of the MU-CQI (i.e. the optimal MU-CQI $\xi$ is the upper bound and the compromised MU-CQI $\xi_{com}$ is the lower bound) for the network. Therefore, the network can choose suitable MCS even if the communication device is not paired with the reported BCI $W_{BCI}$.

(B-2) The second algorithm can be represented by the following equations:

$$j^* = \arg\min_{W_j \neq W_{PMI}} |W_j^* W_{BMI}|, \text{ subject to } |W_{PMI}^* W_j| \geq r;$$

$$\xi_{com} = q(W_{j^*}, W_{BCI});$$

wherein $\xi_{com}$ denotes the compromised MU-CQI, $W_{PMI}$ denotes the PMI, $W_{BCI}$ denotes the BCI, j denotes the precoder entry index in the codebook, r denotes a cross-correlation threshold for the PMI, * denotes the complex-conjugate operation, and the function q denotes the CQI function as shown above.

In detail, the communication device identifies a subset of precoders such that one precoder in the subset has a higher cross-correlation level with the reported BCI $W_{BCI}$ than the cross-correlation threshold r. The communication device further calculates the lowest MU-CQI among all precoders in the subset as the compromised MU-CQI. In other words, the communication device provides the upper bound and the lower bound of the MU-CQI (i.e. the optimal MU-CQI $\xi$ is the upper bound and the compromised MU-CQI $\xi_{com}$ is the lower bound) for the network. Therefore, the network can choose suitable MCS even if the communication device is not paired with the reported PMI $W_{PMI}$.

Note that, the process 40 is an example of the present invention, and those skilled in the art should readily make combinations, modifications and/or alterations on the above-mentioned description and examples. For example, the cross-correlation threshold r can be configured by the network such as using radio resource controller (RRC) messages, which can be broadcast messages or higher layer signaling. The cross-correlation threshold r can also be pre-defined in the specification of the 3rd Generation Partnership Project (3GPP) standard.

In the present invention, the communication devices provide feedback reports for the network so that the network can perform appropriate MCS selection and suitable mode selection from the SU-MIMO mode and the MU-MIMO mode for the communication devices. Therefore, the performance of the downlink MIMO transmissions can be improved.

To sum up, the present invention provides a method for sending feedback reports from the communication devices to the network, to have the appropriate MCS selection and suitable mode selection from the SU-MIMO mode and the MU-MIMO mode for the communication devices, and further improve the performance of the downlink MIMO transmissions.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of enhancing performance of downlink multi-user multiple-input-multiple-output transmissions in a wireless communication system comprising a communication device and a network, the method comprising:
   generating a feedback report comprising a correlation-based validity threshold (CVT), wherein the CVT is configured to maintain deviation of channel quality indication (CQI) within a pre-defined deviation value of CQI; and
   transmitting the feedback report from the communication device to the network.

2. The method of claim 1, wherein the feedback report further comprises a precoding matrix index (PMI), a best companion PMI (BCI) and a multi-user channel quality indication (MU-CQI).

3. The method of claim 2, wherein the MU-CQI is derived from a CQI function of the PMI and the BCI.

4. The method of claim 2, wherein the CVT is derived from a CQI function of the PMI, the BCI and any other precoder in a codebook other than the BCI.

5. The method of claim 4, wherein the CVT is derived according to the following equations:

$$\xi_1 = q(W_{PMI}, W_{BCI});$$

$$\xi_2 = q(W_{PMI}, W_{N\_BCI});$$

$$c = \arg\min |W_{BCI}^* W_{N\_BCI}|, \text{ subject to } (\xi_1 - \xi_2) \leq \Delta\xi,$$
$$\text{where } \Delta\xi \geq 0$$

wherein c denotes the CVT, $W_{PMI}$ denotes the PMI, $W_{BCI}$ denotes the BCI, $W_{N\_BCI}$ denotes the any other precoder in the codebook other than the BCI, $\Delta\xi$ denotes the pre-defined deviation value of CQI, * denotes the complex-conjugate operation, and the function q denotes a CQI function.

6. The method of claim 4, wherein the CVT is derived according to the following equations:

$$\xi_1 = q(W_{PMI}, W_{BCI});$$

$$\xi_2 = q(W_{N\_PMI}, W_{BCI});$$

$$c = \arg\min |W_{PMI}^* W_{N\_PMI}|, \text{ subject to } (\xi_1 - \xi_2) \leq \Delta\xi,$$
$$\text{where } \Delta\xi \geq 0$$

wherein c denotes the CVT, $W_{PMI}$ denotes the PMI, $W_{BCI}$ denotes the BCI, $W_{N\_PMI}$ denotes the any other precoder in the codebook other than the PMI, $\Delta\xi$ denotes the pre-defined deviation value of CQI, * denotes the complex-conjugate operation, and the function q denotes a CQI function.

7. The method of claim 4, wherein the CVT is derived according to the following equations:

$$\xi_1 = q(W_{PMI}, W_{BCI});$$

$$c = \arg\min |W_{BCI}^* W_{N\_BCI}|, \text{ subject to } (\xi_0 - \xi_1) \leq \Delta\xi,$$
$$\text{where } \Delta\xi \geq 0$$

wherein c denotes the CVT, $W_{PMI}$ denotes the PMI, $W_{BCI}$ denotes the BCI, $W_{N\_BCI}$ denotes the any other precoder in the codebook other than the BCI, $\xi_0$ denotes the CQI under single-user MIMO assumption (SU-CQI), $\Delta\xi$ denotes the pre-defined deviation value of CQI, * denotes the complex-conjugate operation, and the function q denotes a CQI function.

8. The method of claim 4, wherein the CVT is derived according to the following equations:

$$\xi_1 = q(W_{PMI}, W_{BCI});$$

$$c = \arg\min |W_{PMI}^* W_{N\_PMI}|, \text{ subject to } (\xi_0 - \xi_1) \leq \Delta\xi,$$
$$\text{where } \Delta\xi \geq 0$$

wherein c denotes the CVT, $W_{PMI}$ denotes the PMI, $W_{BCI}$ denotes the BCI, $W_{N\_PMI}$ denotes the any other precoder in the codebook other than the PMI, $\xi_0$ denotes the CQI under single-user MIMO assumption (SU-CQI), $\Delta\xi$ denotes the pre-defined deviation value of CQI, * denotes the complex-conjugate operation, and the function q denotes a CQI function.

9. A method of enhancing performance of downlink multi-user multiple-input-multiple-output transmissions in a wireless communication system comprising a communication device and a network, the method comprising:
generating a feedback report comprising a compromised multi-user channel quality indication (MU-CQI), a precoding matrix index (PMI), a best companion PMI (BCI) and an optimal MU-CQI; and
transmitting the feedback report from the communication device to the network;
wherein the compromised MU-CQI is derived from a cross-correlation threshold and a CQI function of the PMI, the BCI and any other precoder in a codebook other than the BCI, and the cross-correlation threshold is configured by the network or pre-defined in a specification.

10. The method of claim 9, wherein the optimal MU-CQI is derived from a CQI function of the PMI and the BCI.

11. The method of claim 9, wherein the compromised MU-CQI is derived according to the following equations:

$$j^* = \arg\min_{W_j |W_{PMI}^* W_j|, \text{ subject to } |W_{BCI}^* W_j| \geq r,}$$
$$W_j \neq W_{BCI}$$

$$\xi_{com} = q(W_{PMI}, W_j^*);$$

wherein $\xi_{com}$ denotes the compromised MU-CQI, $W_{PMI}$ denotes the PMI, $W_{BCI}$ denotes the BCI, j denotes the precoder entry index in the codebook, r denotes the cross-correlation threshold for the PMI, * denotes the complex-conjugate operation, and the function q denotes a CQI function.

12. The method of claim 9, wherein the compromised MU-CQI is derived according to the following equations:

$$j^* = \arg\min_{W_j |W_j^* W_{BMI}|, \text{ subject to } |W_{PMI}^* W_j| \geq r,}$$
$$W_j \neq W_{PMI}$$

$$\xi_{com} = q(W_j^*, W_{BCI});$$

wherein $\xi_{com}$ denotes the compromised MU-CQI, $W_{PMI}$ denotes the PMI, $W_{BCI}$ denotes the BCI, j denotes the precoder entry index in the codebook, r denotes the cross-correlation threshold for the PMI, * denotes the complex-conjugate operation, and the function q denotes a CQI function.

13. A communication apparatus for a wireless communication system, comprising:
a processing means;
a storage unit, for storing a program code, wherein the program code instructs the processing means to execute the following steps:
generating a feedback report comprising a correlation-based validity threshold (CVT), wherein the CVT is configured to maintain deviation of channel quality indication (CQI) within a pre-defined deviation value of CQI; and
transmitting the feedback report from a communication device to a network.

14. The communication apparatus of claim 13, wherein the feedback report further comprises a precoding matrix index (PMI), a best companion PMI (BCI) and a multi-user channel quality indication (MU-CQI).

15. The communication apparatus of claim 14, wherein the MU-CQI is derived from a CQI function of the PMI and the BCI.

16. The communication apparatus of claim 14, wherein the CVT is derived from a CQI function of the PMI, the BCI and any other precoder in a codebook other than the BCI.

17. The communication apparatus of claim 16, wherein the CVT is derived according to the following equations:

$$\xi_1 = q(W_{PMI}, W_{BCI});$$

$$\xi_2 = q(W_{PMI}, W_{N\_BCI});$$

$$c = \arg\min |W_{BCI}^* W_{N\_BCI}|, \text{ subject to } (\xi_1 - \xi_2) \leq \Delta\xi,$$
$$\text{where } \Delta\xi \geq 0$$

wherein c denotes the CVT, $W_{PMI}$ denotes the PMI, $W_{BCI}$ denotes the BCI, $W_{N\_BCI}$ denotes the any other precoder in the codebook other than the BCI, $\Delta\xi$ denotes the pre-defined deviation value of CQI, * denotes the complex-conjugate operation, and the function q denotes a CQI function.

18. The communication apparatus of claim 16, wherein the CVT is derived according to the following equations:

$$\xi_1 = q(W_{PMI}, W_{BCI});$$

$$\xi_2 = q(W_{N\_PMI}, W_{BCI});$$

$$c = \arg\min |W_{PMI}^* W_{N\_PMI}|, \text{ subject to } (\xi_1 - \xi_2) \leq \Delta\xi,$$
$$\text{where } \Delta\xi \geq 0$$

wherein c denotes the CVT, $W_{PMI}$ denotes the PMI, $W_{BCI}$ denotes the BCI, $W_{N\_PMI}$ denotes the any other precoder in the codebook other than the PMI, $\Delta\xi$ denotes the pre-defined deviation value of CQI, * denotes the complex-conjugate operation, and the function q denotes a CQI function.

19. The communication apparatus of claim 16, wherein the CVT is derived according to the following equations:

$$\xi_1 = q(W_{PMI}, W_{BCI});$$

$$c = \arg\min |W_{BCI}^* W_{N\_BCI}|, \text{ subject to } (\xi_0 - \xi_1) \leq \Delta\xi,$$
$$\text{where } \Delta\xi \geq 0$$

wherein c denotes the CVT, $W_{PMI}$ denotes the PMI, $W_{BCI}$ denotes the BCI, $W_{N\_BCI}$ denotes the any other precoder in the codebook other than the BCI, $\xi_0$ denotes the CQI under single-user MIMO assumption (SU-CQI), $\Delta\xi$ denotes the pre-defined deviation value of CQI, * denotes the complex-conjugate operation, and the function q denotes a CQI function.

20. The communication apparatus of claim 16, wherein the CVT is derived according to the following equations:

$$\xi_1 = q(W_{PMI}, W_{BCI});$$

$$c = \arg\min |W_{PMI}^* W_{N\_PMI}|, \text{ subject to } (\xi_0 - \xi_1) \leq \Delta\xi,$$
$$\text{where } \Delta\xi \geq 0$$

wherein c denotes the CVT, $W_{PMI}$ denotes the PMI, $W_{BCI}$ denotes the BCI, $W_{N\_PMI}$ denotes the any other precoder in the codebook other than the PMI, $\xi_0$ denotes the CQI under single-user MIMO assumption (SU-CQI), $\Delta\xi$ denotes the pre-defined deviation value of CQI, * denotes the complex-conjugate operation, and the function q denotes a CQI function.

21. A communication apparatus for a wireless communication system, comprising:
a processing means;
a storage unit, for storing a program code, wherein the program code instructs the processing means to execute the following steps:
generating a feedback report comprising a compromised multi-user channel quality indication (MU-CQI), a precoding matrix index (PMI), a best companion PMI (BCI) and an optimal MU-CQI; and
transmitting the feedback report from a communication device to a network;
wherein the compromised MU-CQI is derived from a cross-correlation threshold and a CQI function of the PMI, the BCI and any other precoder in a codebook other than the BCI, and the cross-correlation threshold is configured by the network or pre-defined in a specification.

22. The communication apparatus of claim 21, wherein the optimal MU-CQI is derived from a CQI function of the PMI and the BCI.

23. The communication apparatus of claim 21, wherein the compromised MU-CQI is derived according to the following equations:

$$j^* = \arg\min\nolimits_{W_j \neq W_{BCI}} |W_{PMI}^* W_j|, \text{ subject to } |W_{BCI}^* W_j| \geq r;$$

$$\xi_{com} = q(W_{PMI}, W_j^*);$$

wherein $\xi_{com}$, denotes the compromised MU-CQI, $W_{PMI}$ denotes the PMI, $W_{BCI}$ denotes the BCI, j denotes the precoder entry index in the codebook, r denotes the cross-correlation threshold for the PMI, * denotes the complex-conjugate operation, and the function q denotes a CQI function.

24. The communication apparatus of claim 21, wherein the compromised MU-CQI is derived according to the following equations:

$$j^* = \arg\min\nolimits_{W_j \neq W_{PMI}} |W_j^* W_{BMI}|, \text{ subject to } |W_{PMI}^* W_j| \geq r;$$

$$\xi_{com} = q(W_j^*, W_{BCI});$$

wherein $\xi_{com}$ denotes the compromised MU-CQI, $W_{PMI}$ denotes the PMI, $W_{BCI}$ denotes the BCI, j denotes the precoder entry index in the codebook, r denotes the cross-correlation threshold for the PMI, * denotes the complex-conjugate operation, and the function q denotes a CQI function.

* * * * *